United States Patent
Kikuchi et al.

[11] Patent Number: 5,270,865
[45] Date of Patent: Dec. 14, 1993

[54] COMPACT ZOOM LENS

[75] Inventors: Shuichi Kikuchi, Yokohama; Masami Itoh, Higashi-Kurume, both of Japan

[73] Assignee: Ricoh Company, Ltd., Tokyo, Japan

[21] Appl. No.: 942,273

[22] Filed: Sep. 9, 1992

[30] Foreign Application Priority Data

Oct. 9, 1991 [JP] Japan .................. 3-262369

[51] Int. Cl.⁵ .................. G02B 15/14
[52] U.S. Cl. .................. 359/686
[58] Field of Search .................. 359/686, 685

[56] References Cited

U.S. PATENT DOCUMENTS

| | | | |
|---|---|---|---|
| 4,432,615 | 2/1984 | Ikemori | 359/685 |
| 4,437,732 | 3/1984 | Ishiyama | 359/685 |
| 4,787,718 | 11/1988 | Cho | 359/686 |
| 4,846,562 | 7/1989 | Tokumaru et al. | 359/686 |
| 4,861,145 | 8/1989 | Kikuchi . | |
| 4,909,613 | 3/1990 | Kikuchi . | |
| 5,042,926 | 8/1991 | Kikuchi . | |
| 5,111,338 | 5/1992 | Nakayama | 359/686 |
| 5,126,883 | 6/1992 | Sato et al. | 359/685 |
| 5,170,292 | 12/1992 | Yamanashi | 359/686 |
| 5,173,806 | 12/1992 | Ogata | 359/686 |
| 5,184,251 | 2/1993 | Tsuchida et al. | 359/686 |
| 5,196,962 | 3/1993 | Aoki | 359/686 |
| 5,204,779 | 4/1993 | Nakata et al. | 359/686 |

Primary Examiner—John T. Kwon
Attorney, Agent, or Firm—Oblon, Apivak, McClelland, Maier & Neustadt

[57] ABSTRACT

A compact zoom lens has first to fourth lens groups sequentially arranged from an object side. The first, second and fourth lens groups respectively have negative, positive and negative focal lengths. When a zooming operation is performed from a wide angle end to a telescopic end, a distance between the first and second lens groups is decreased, a distance between the second and third lens groups is increased, and a distance between the third and fourth lens groups is decreased. Focal lengths $f_1$ and $f_2$ of the first and second lens groups, focal lengths $f_{2,3,4W}$ and $f_{2,3,4T}$ of a combined lens system of the second, third and fourth lens groups at the wide angle end and the telescopic end, a focal length $f_{3,4T}$ of a combined lens system of the third and fourth lens groups at the telescopic end, focal lengths $f_W$ and $f_T$ of an entire lens system at the wide angle end and the telescopic end satisfy the following conditions where symbol $\sqrt{[\ ]}$ means a square root of a value within bracket [ ].

$$[f_1 + f_{2,3,4W}\{2-(f_1/f_W)-(f_W/f_1)\}]/f_T < 0.6 \quad (1)$$

$$[f_1 + f_{2,3,4T}\{2-(f_1/f_T)-(f_T/f_1)\}]/f_T < 0.6 \quad (2)$$

$$0.6 < |f_{3,4T}|/f_2 < 6.0 \quad (3)$$

$$0.8 < f_2/f_{2,3,4T} < 1.4 \quad (4)$$

$$0.5 < |f_1|/\sqrt{[f_W \cdot f_T]} < 1.3 \quad (5)$$

4 Claims, 14 Drawing Sheets

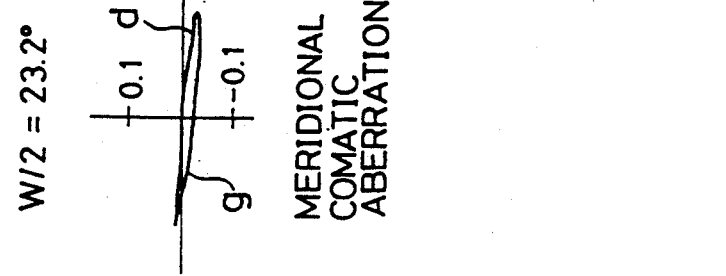
Fig. 6d
Fig. 6c
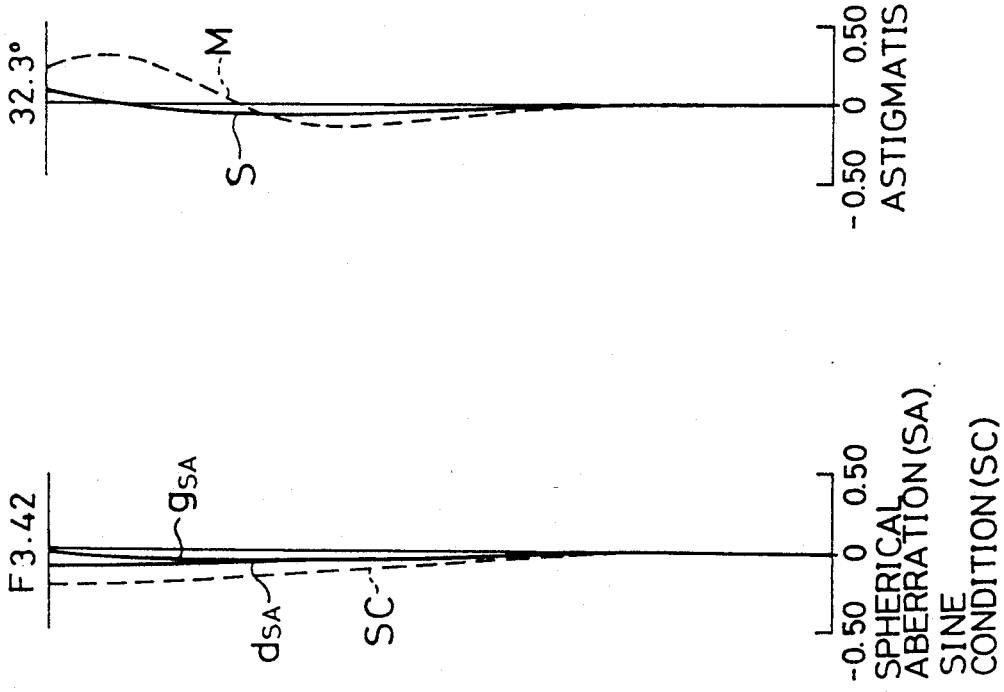
Fig. 6b
Fig. 6a

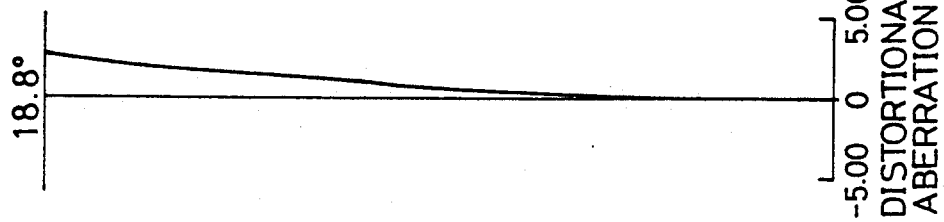
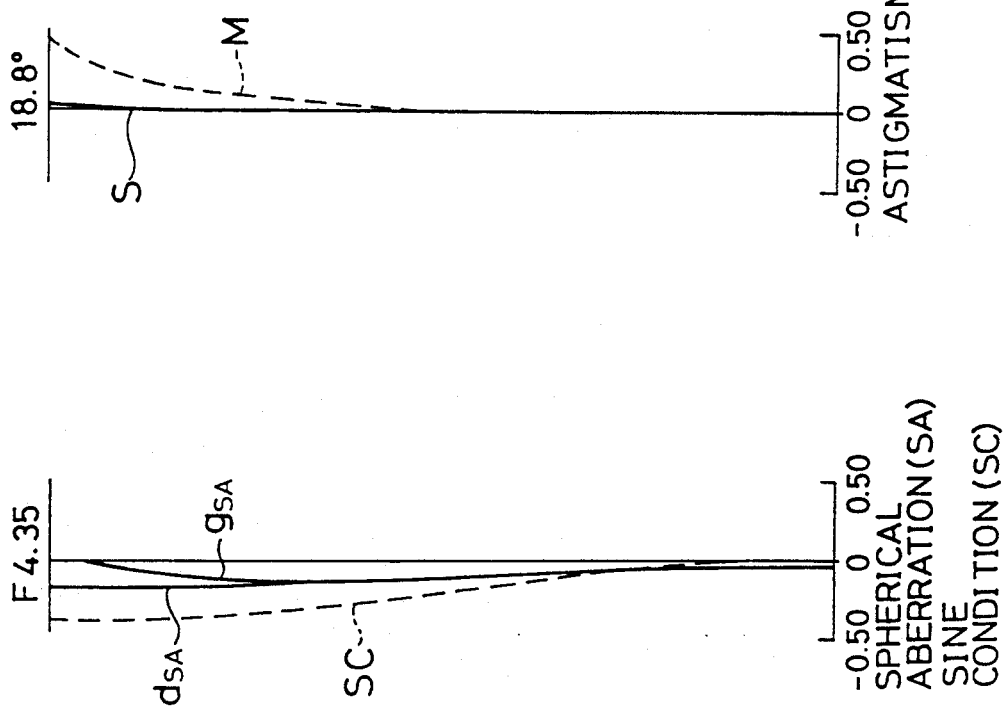

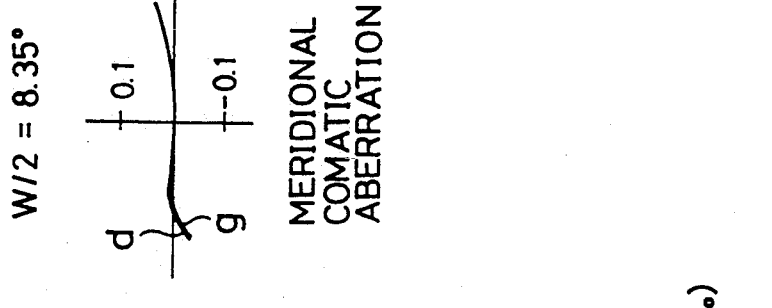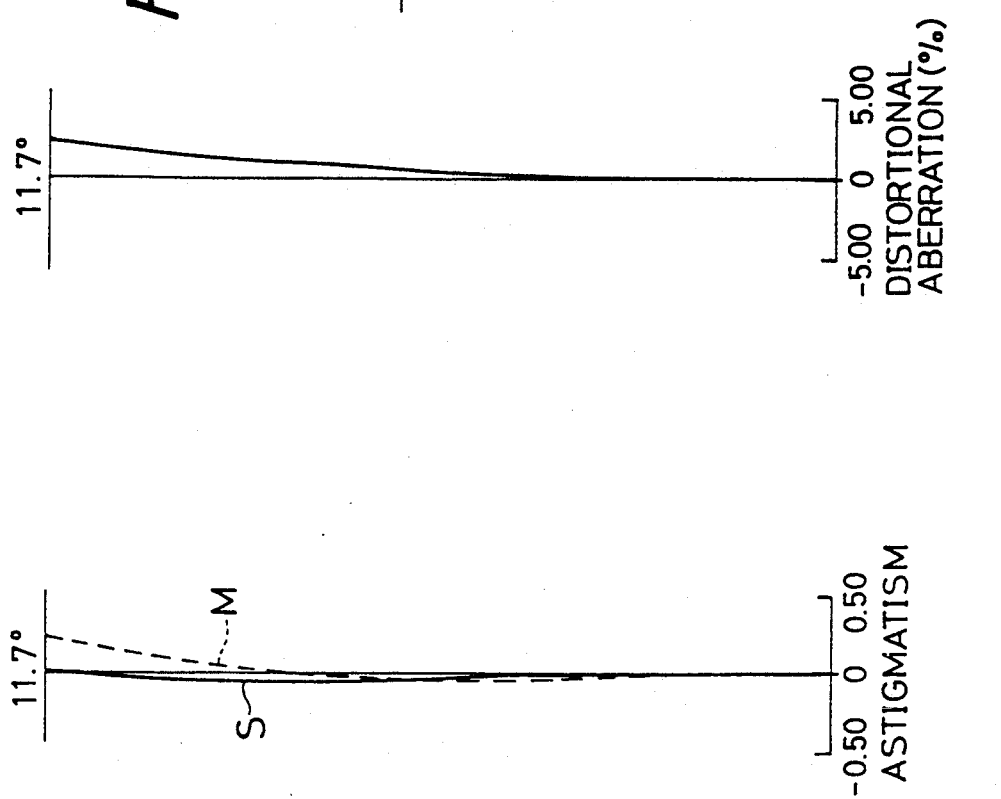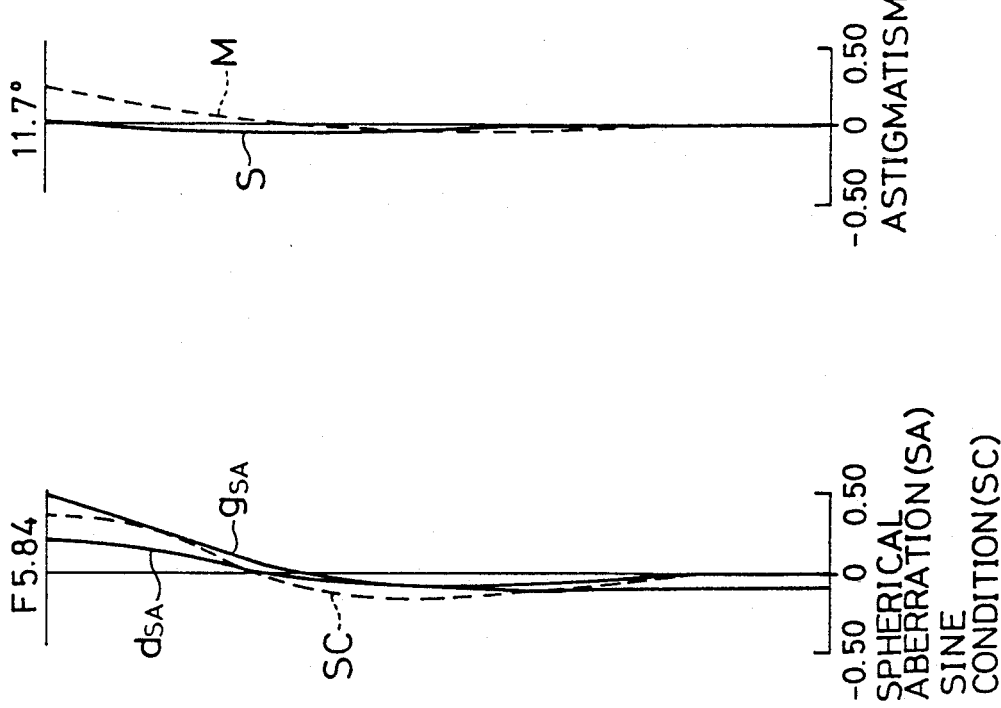

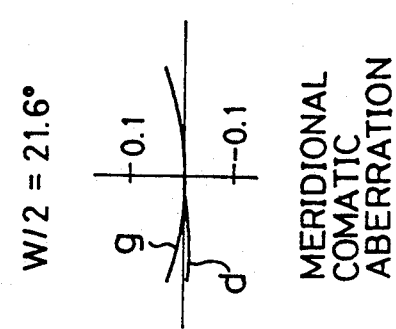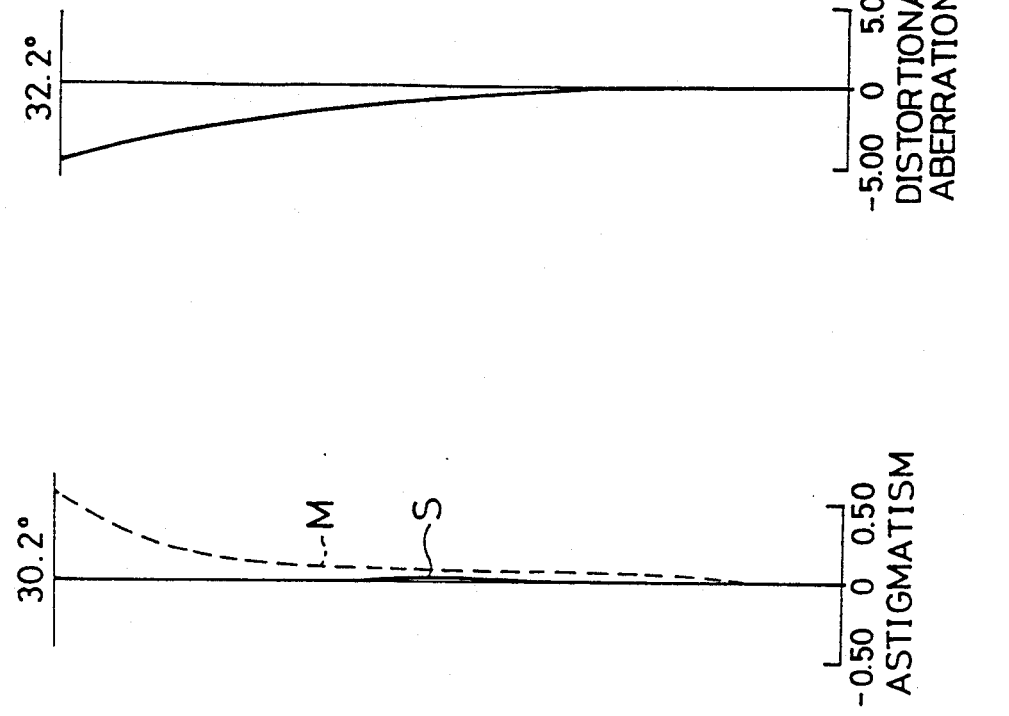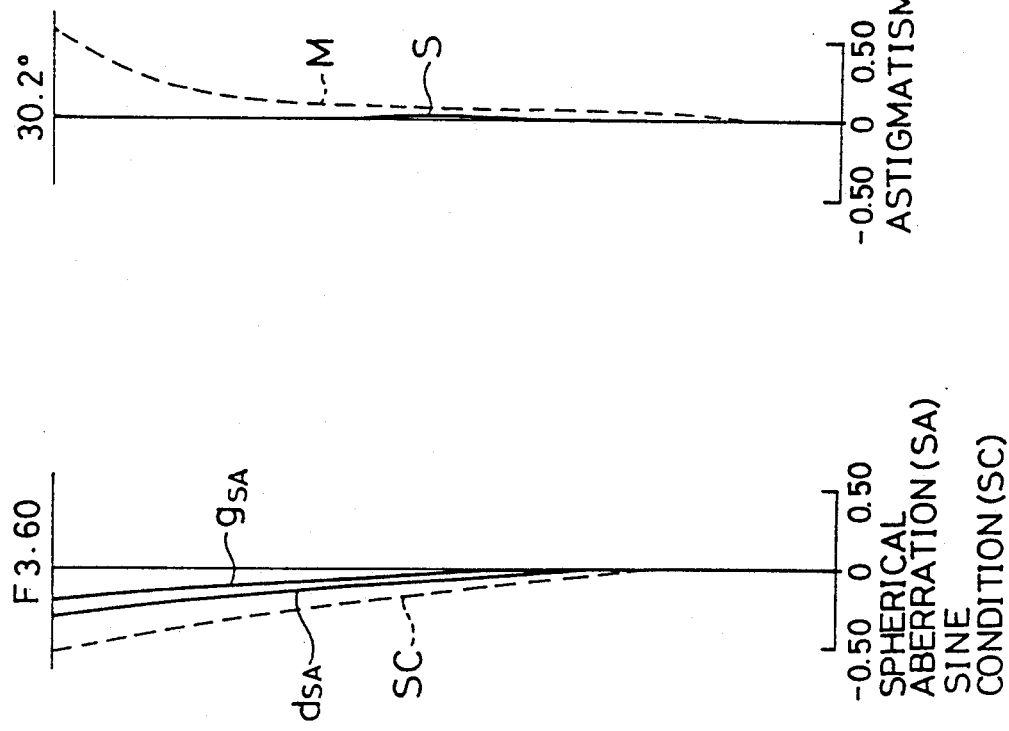

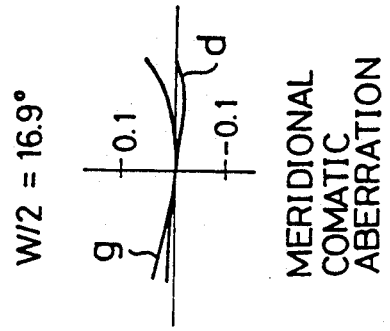
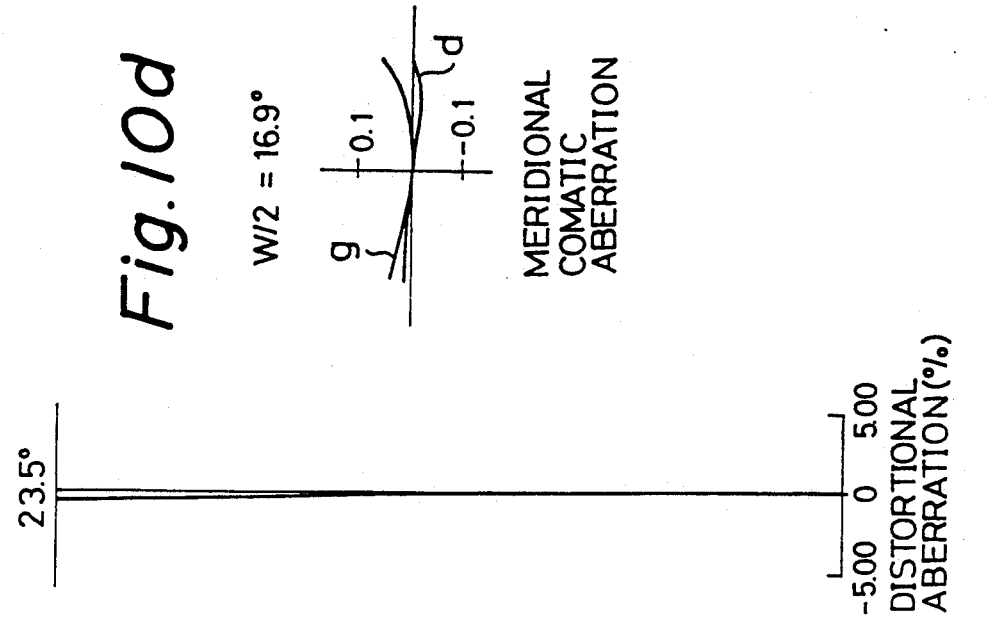
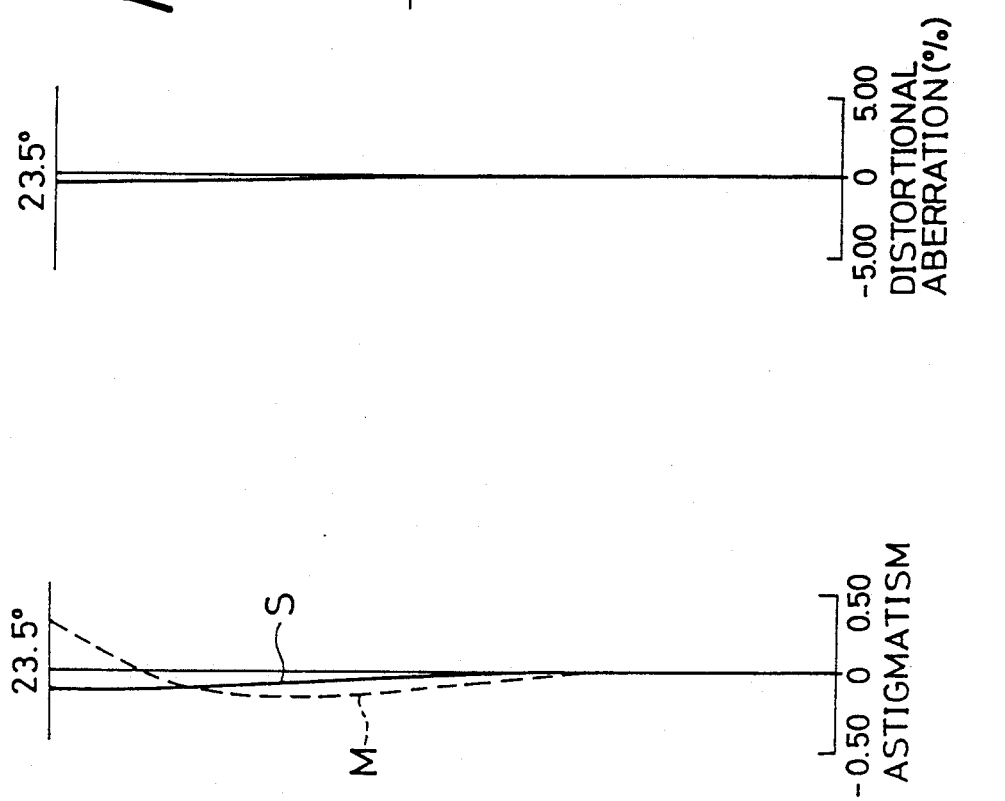
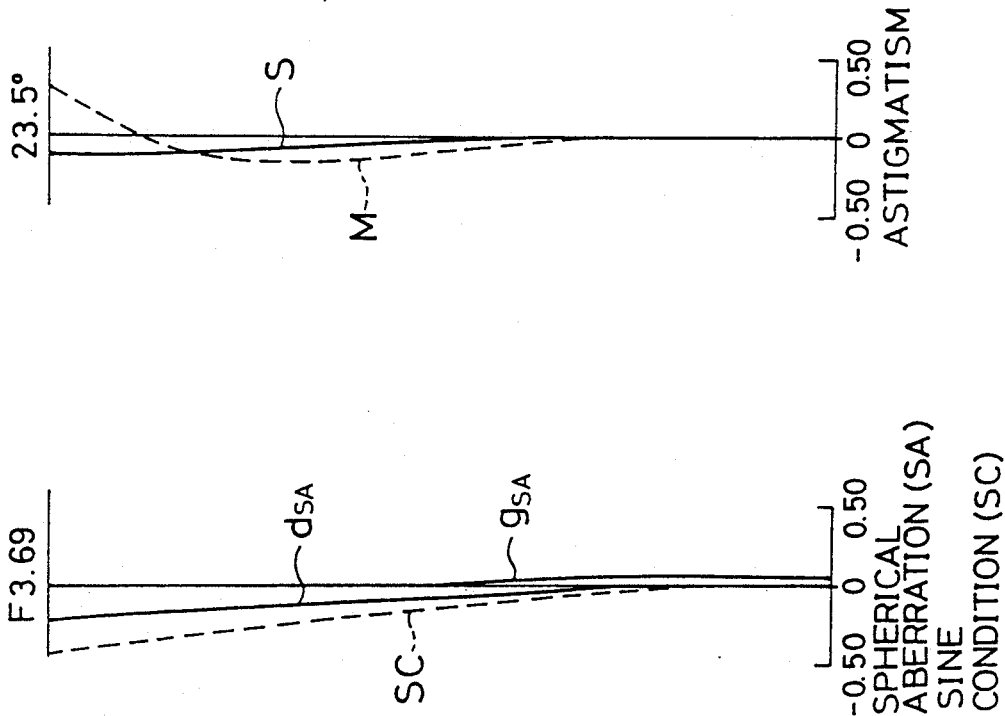

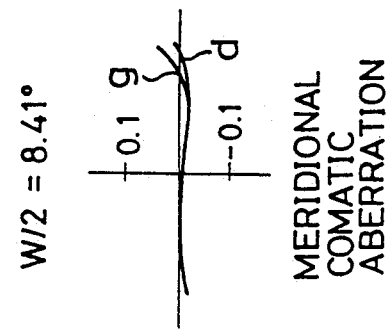
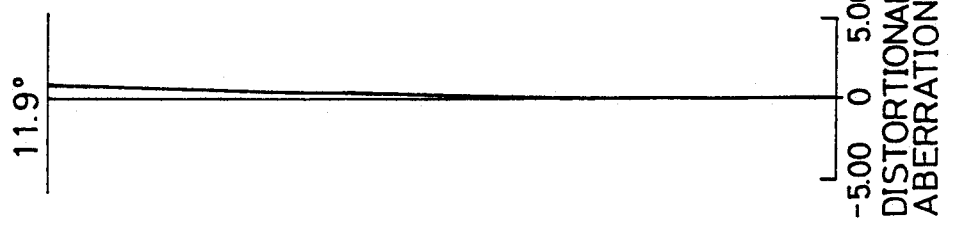
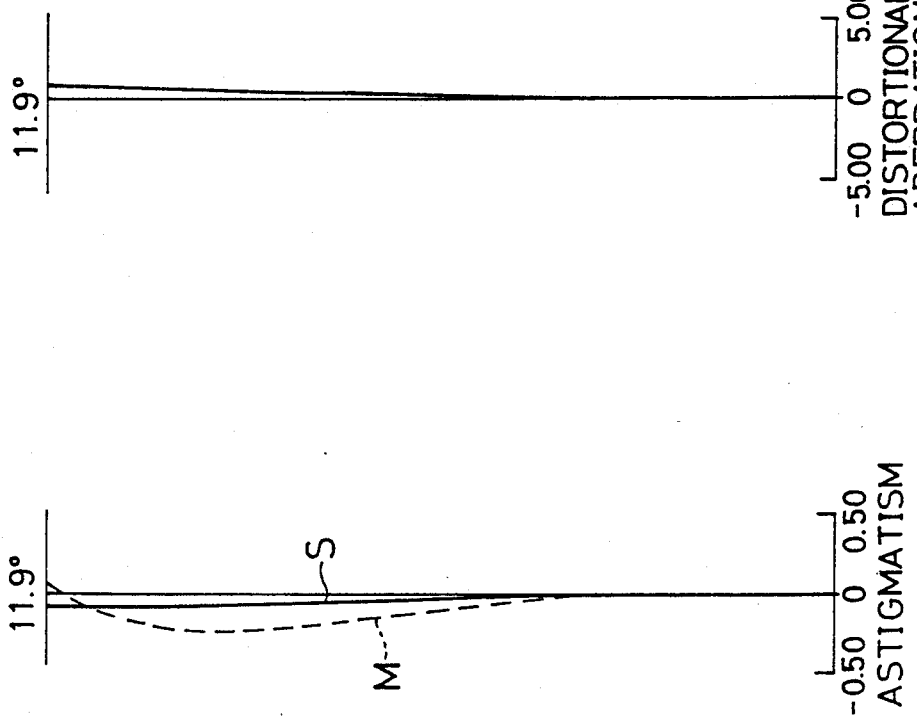
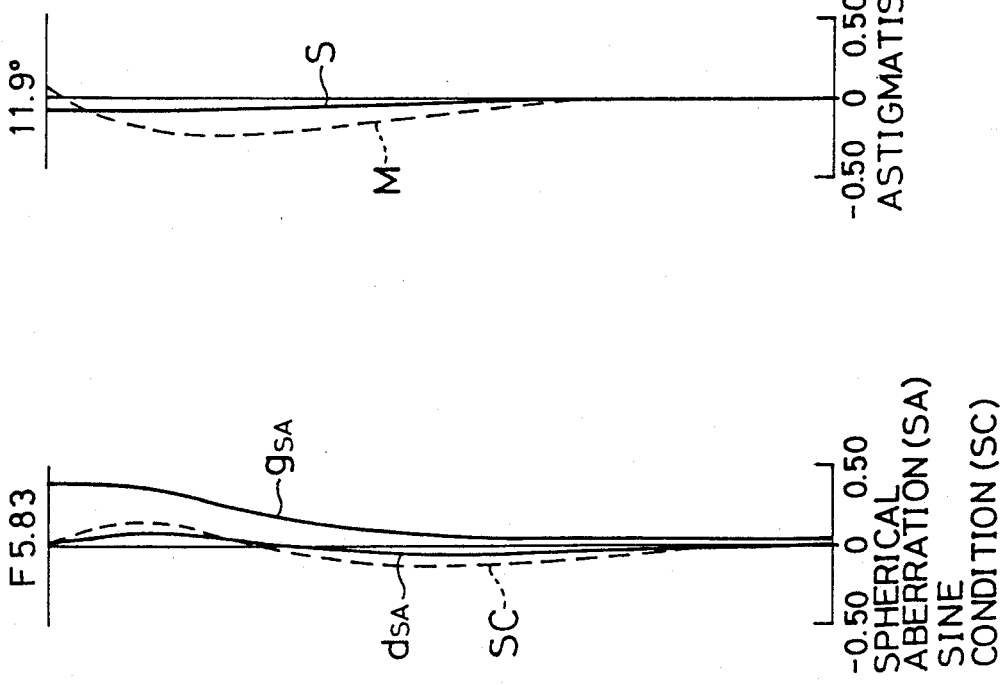

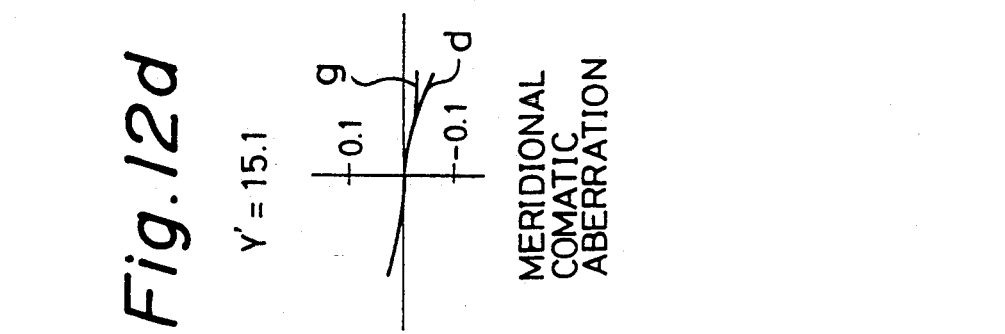
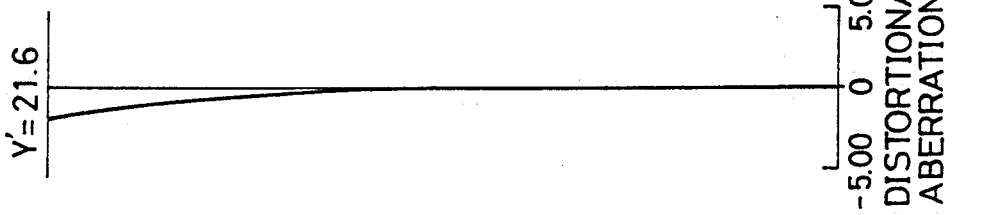
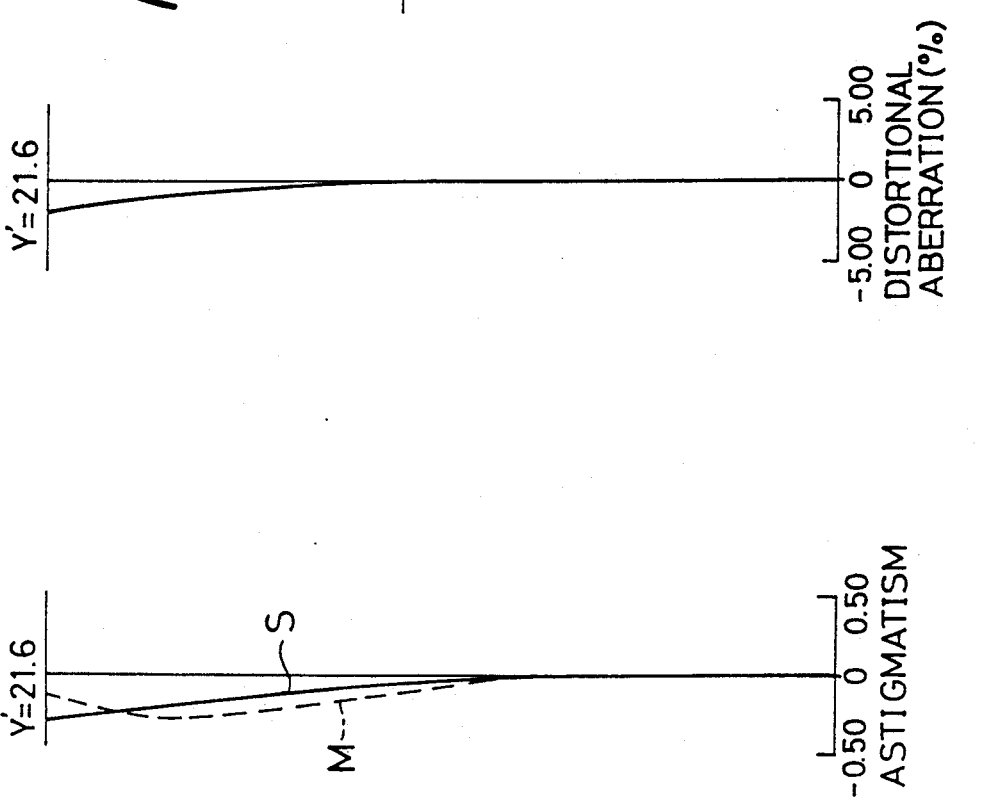
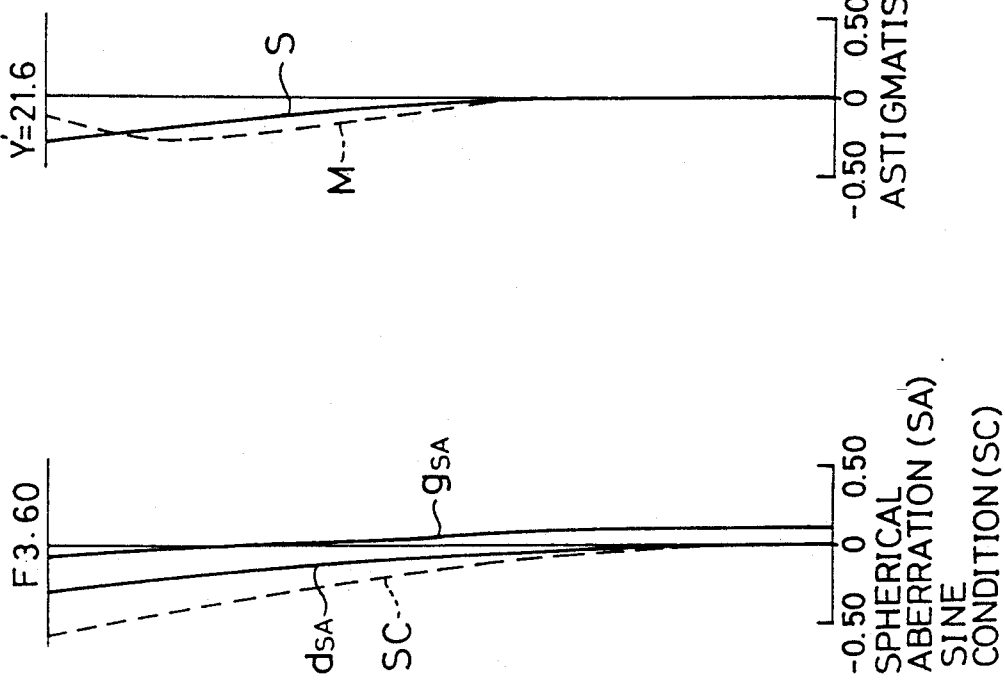

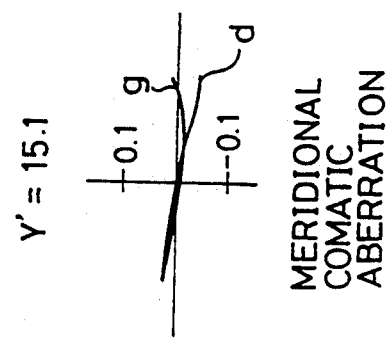
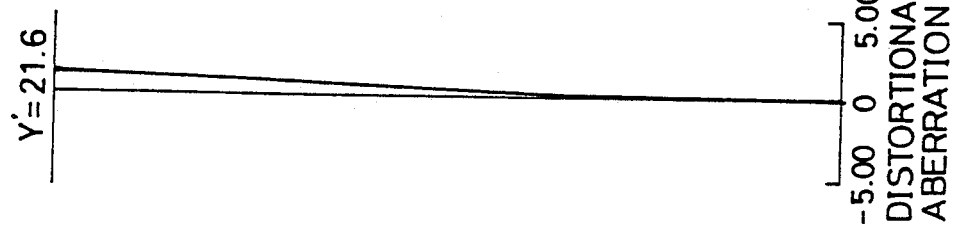
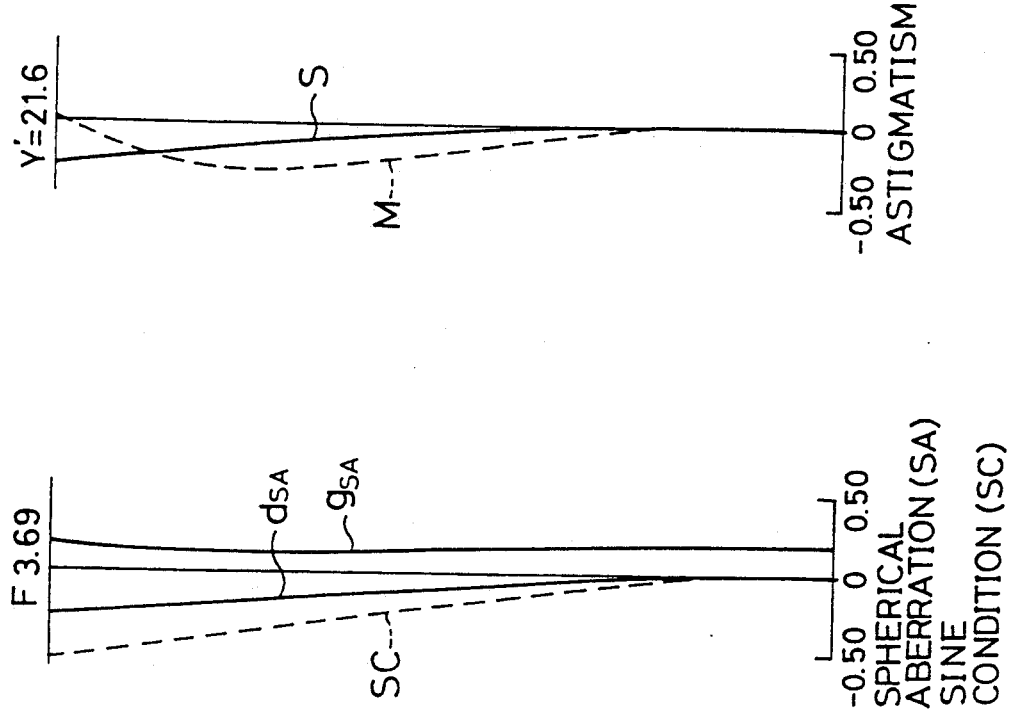

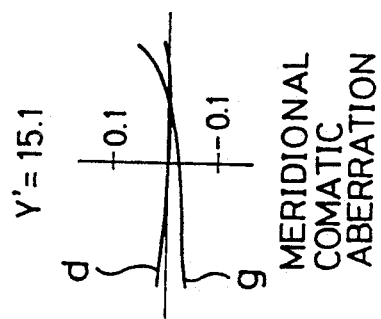
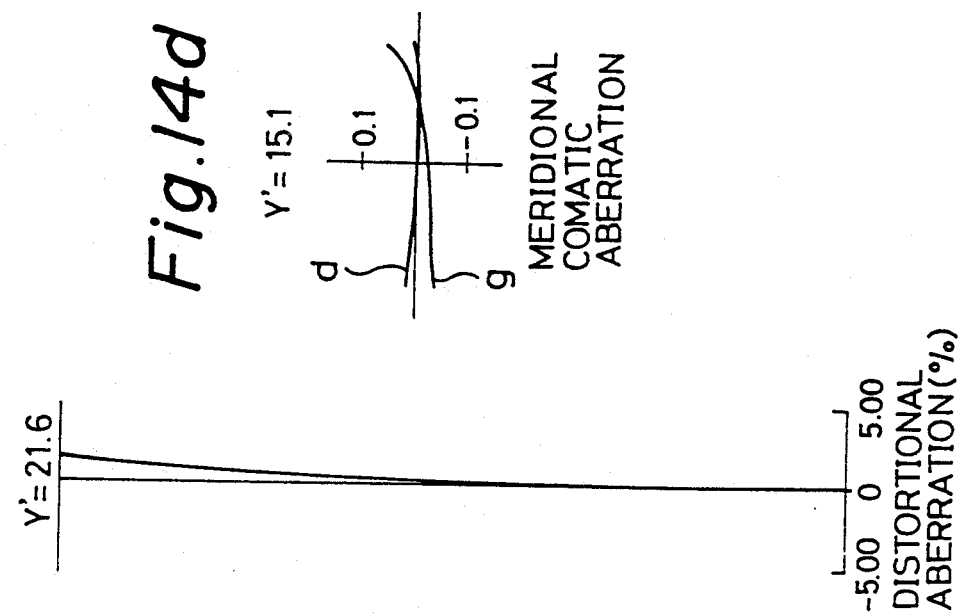
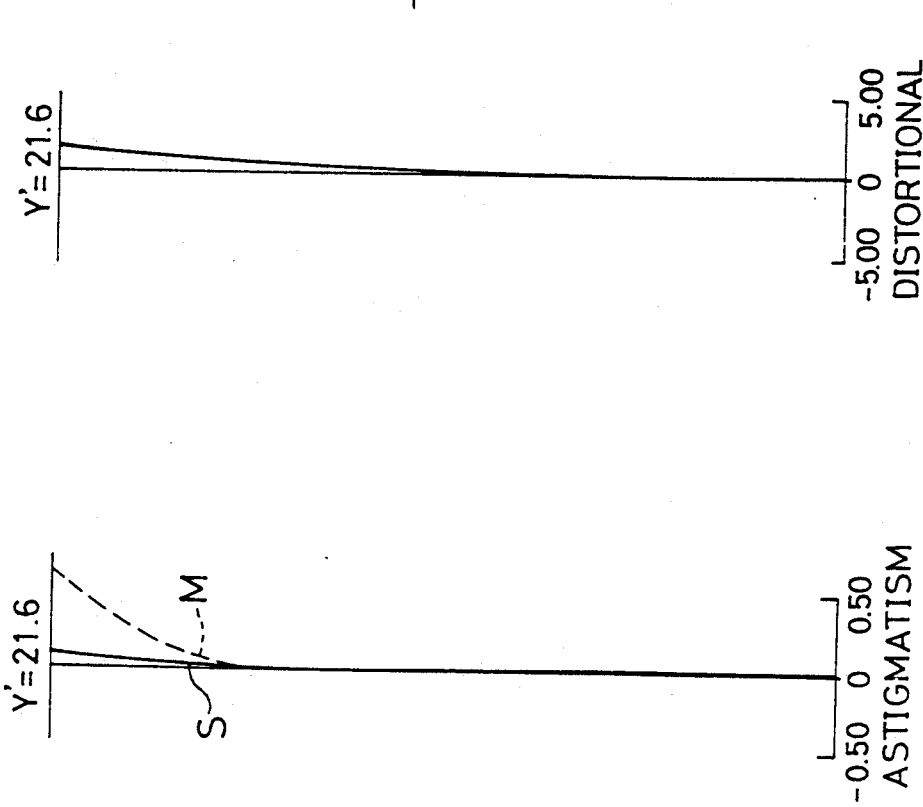
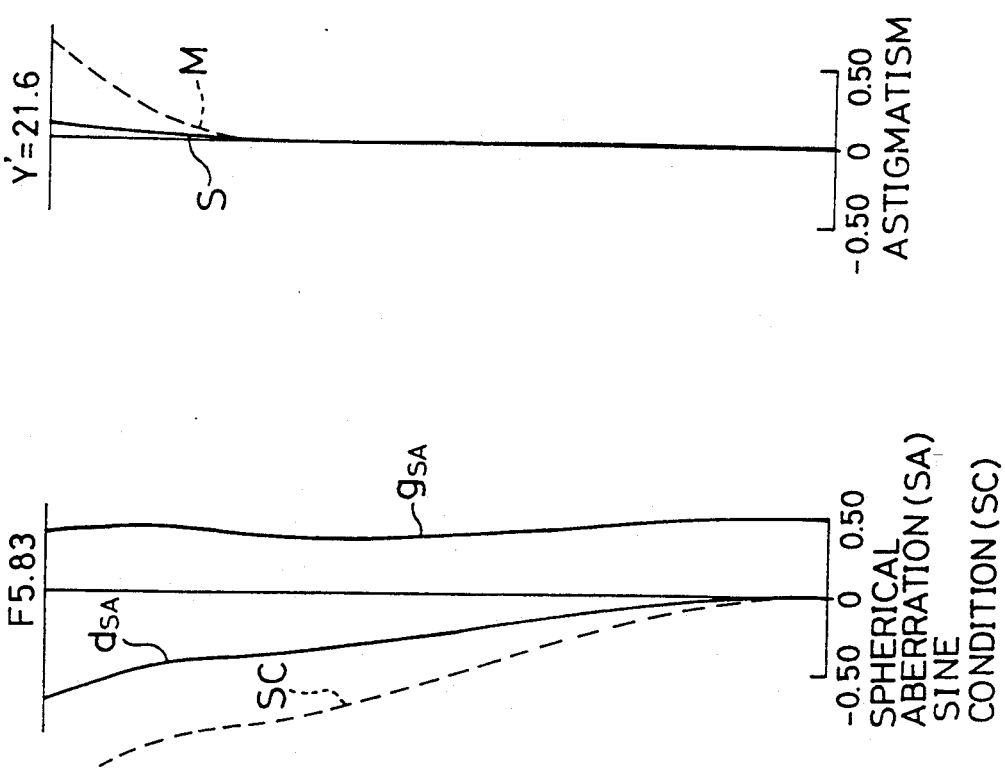

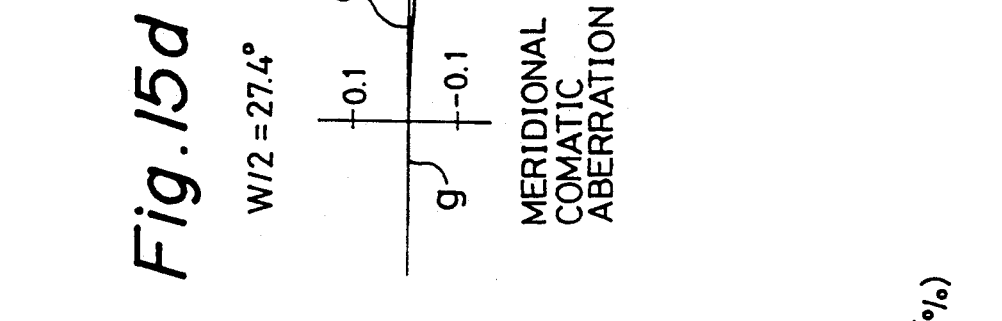
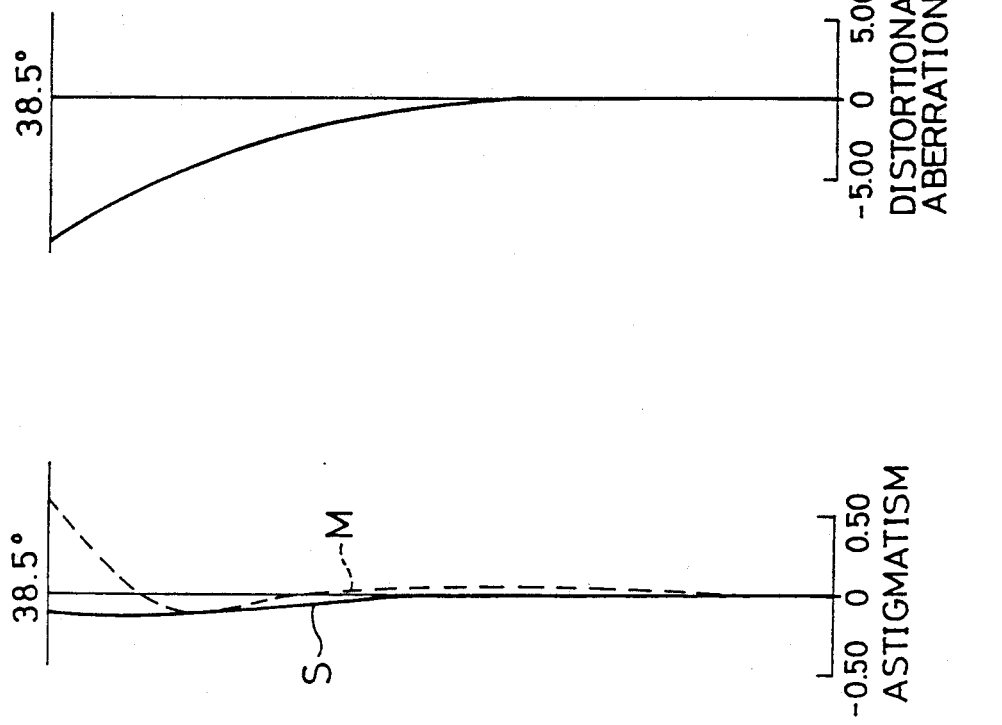
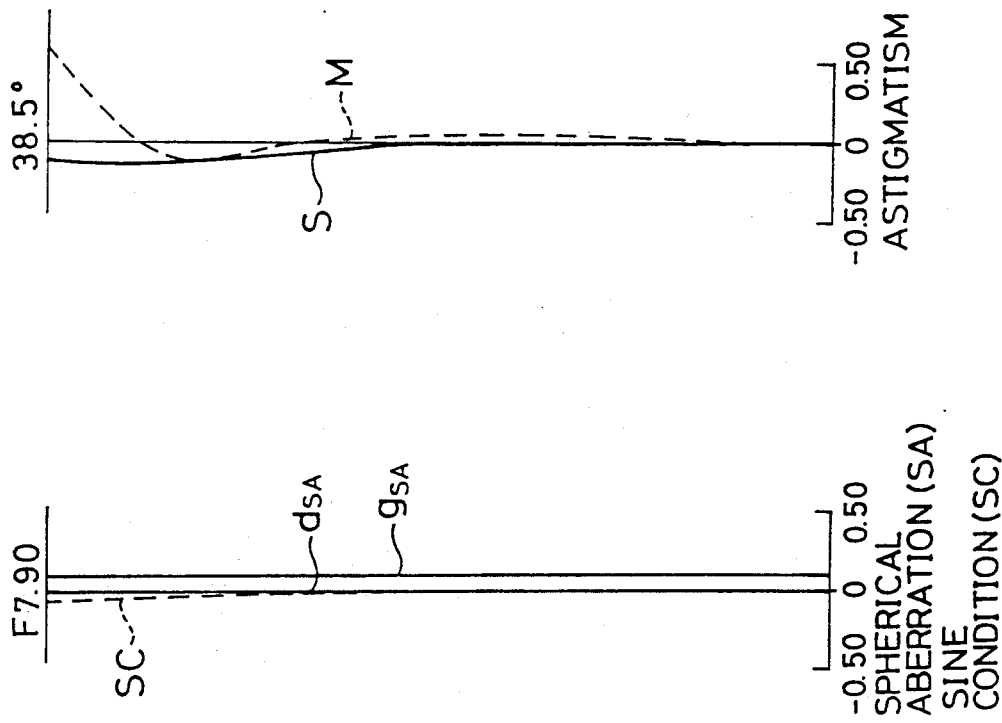

COMPACT ZOOM LENS

BACKGROUND OF THE INVENTION

1. Field of the Invention

The present invention relates to a compact zoom lens composed of a plurality of lenses.

2. Description of the Related Art

A high zoom ratio and compactness is consistently required in a zoom lens for a 35 mm lens shutter camera. To satisfy these requirements, Japanese Patent Application Laying Open (KOKAI) No. 64-88512 shows a zoom lens composed of four lens groups respectively having negative, positive, positive and negative focal lengths and having a zoom ratio about three times. In the case of this zoom lens, a ratio of a maximum entire length and a focal length at a telescopic end is equal to about 0.9 so that the zoom lens is compact and an F-number (F/No) on a telescopic side is equal to about 6 showing a bright state.

However, a zooming operation is mainly performed by a fourth lens group in this zoom lens. The fourth lens group has a short focal length and a moving amount of this fourth lens group is large. Therefore, it is necessary to dispose a mechanical mechanism for moving the fourth lens group by a large moving amount, which is disadvantageous to make a lens body tube compact. Further, the fourth lens group is constructed by three lenses to reduce the generation of aberration. The fourth lens group approaches an image face at a wide angle end of the zoom lens so that it is necessary to increase a lens diameter. Accordingly, it is disadvantageous to construct the fourth lens group by three lenses in view of cost, weight and space. It is also very disadvantageous to make the lens body tube compact in consideration of the large moving amount of the fourth lens group. This zoom lens has a diaphragm in a second lens group in which a light beam on an optical axis of the zoom lens is widened. A diameter of the diaphragm is increased so that the lens body tube is large-sized.

SUMMARY OF THE INVENTION

It is therefore an object of the present invention to provide a compact zoom lens constructed by four lens groups in which the moving amount of a fourth lens group caused by a zooming operation is small and the number of lenses constituting the fourth lens group is small and the zoom lens has a zoom ratio equal to or higher than 2.5 times and an F-number (F/No) at a telescopic end is equal to about 5.8 showing a bright state and a ratio of a maximum entire length and a focal length of the zoom lens at the telescopic end is equal to or smaller than one.

The above object of the present invention can be achieved by a compact zoom lens comprising first to fourth lens groups sequentially arranged from an object side; the first, second and fourth lens groups respectively having negative, positive and negative focal lengths; the zoom lens being constructed such that a distance between the first and second lens groups is decreased, a distance between the second and third lens groups is increased, and a distance between the third and fourth lens groups is decreased when a zooming operation is performed from a wide angle end to a telescopic end. A focal length $f_1$ of the first lens group, a focal length $f_2$ of the second lens group, a focal length $f_{2,3,4W}$ of a combined lens system of the second, third and fourth lens groups at the wide angle end, a focal length $f_{2,3,4T}$ of the combined lens system of the second, third and fourth lens groups at the telescopic end, a focal length $f_{3,4T}$ of a combined lens system of the third and fourth lens groups at the telescopic end, a focal length $f_W$ of an entire lens system at the wide angle end, and a focal length $f_T$ of the entire lens system at the telescopic end satisfy the following conditions.

$$[f_1 + f_{2,3,4W}\{2-(f_1/f_W)-(f_W/f_1)\}]/f_T < 0.6 \quad (1)$$

$$[f_1 + f_{2,3,4T}\{2-(f_1/f_T)-(f_T/f_1)\}]/f_T < 0.6 \quad (2)$$

$$0.6 < |f_{3,4T}|/f_2 < 6.0 \quad (3)$$

$$0.8 < f_2/f_{2,3,4T} < 1.4 \quad (4)$$

$$0.5 < |f_1|/\sqrt{[f_W \cdot f_T]} < 1.3 \quad (5)$$

In the condition (5), symbol $\sqrt{[\ ]}$ means a square root of a value within bracket [ ].

In the above compact zoom lens constructed by the four lens groups, a moving amount of the fourth lens group caused by the zooming operation is small and the number of lenses constituting the fourth lens group is small. The zoom lens has a zoom ratio equal to or higher than 2.5 times. An F-number (F/No) at the telescopic end is equal to about 5.8 showing a bright state. A ratio of a maximum entire length and the focal length of the zoom lens at the telescopic end is equal to or smaller than one.

Further objects and advantages of the present invention will be apparent from the following description of the preferred embodiments of the present invention as illustrated in the accompanying drawings.

BRIEF DESCRIPTION OF THE DRAWINGS

FIGS. 6a to 6d are diagrams respectively showing spherical aberration, astigmatism, distortional aberration and meridional comatic aberration at the wide angle end of the zoom lens when a distance between a photographed object and the zoom lens is set to be infinite in the Embodiment 1;

FIGS. 7a to 7d are diagrams respectively showing spherical aberration, astigmatism, distortional aberration and meridional comatic aberration at an intermediate focal length of the zoom lens when the distance between the photographed object and the zoom lens is set to be infinite in the Embodiment 1;

FIGS. 8a to 8d are diagrams respectively showing spherical aberration, astigmatism, distortional aberration and meridional comatic aberration at a telescopic end of the zoom lens when the distance between the photographed object and the zoom lens is set to be infinite in the Embodiment 1;

FIGS. 9a to 9d are diagrams respectively showing spherical aberration, astigmatism, distortional aberration and meridional comatic aberration at the wide angle end of the zoom lens when the distance between the photographed object and the zoom lens is set to be infinite in the Embodiment 2;

FIGS. 10a to 10d are diagrams respectively showing spherical aberration, astigmatism, distortional aberration and meridional comatic aberration at an intermediate focal length of the zoom lens when the distance between the photographed object and the zoom lens is set to be infinite in the Embodiment 2;

FIGS. 11a to 11d are diagrams respectively showing spherical aberration, astigmatism, distortional aberration and meridional comatic aberration at a telescopic end of the zoom lens when the distance between the photographed object and the zoom lens is set to be infinite in the Embodiment 2;

FIGS. 12a to 12d are diagrams respectively showing spherical aberration, astigmatism, distortional aberration and meridional comatic aberration at the wide angle end of the zoom lens when the distance between the photographed object and the zoom lens is set to 1 m in the Embodiment 2;

FIGS. 13a to 13d are diagrams respectively showing spherical aberration, astigmatism, distortional aberration and meridional comatic aberration at the intermediate focal length of the zoom lens when the distance between the photographed object and the zoom lens is set to 1 m in the Embodiment 2;

FIGS. 14a to 14d are diagrams respectively showing spherical aberration, astigmatism, distortional aberration and meridional comatic aberration at the telescopic end of the zoom lens when the distance between the photographed object and the zoom lens is set to 1 m in the Embodiment 2; and FIGS. 15a to 15d are diagrams respectively showing spherical aberration, astigmatism, distortional aberration and meridional comatic aberration at a super wide angle end of the zoom lens in the Embodiment 2.

DESCRIPTION OF THE PREFERRED EMBODIMENTS

The preferred embodiments of a compact zoom lens in the present invention will next be described in detail with reference to the accompanying drawings.

Figure 1:
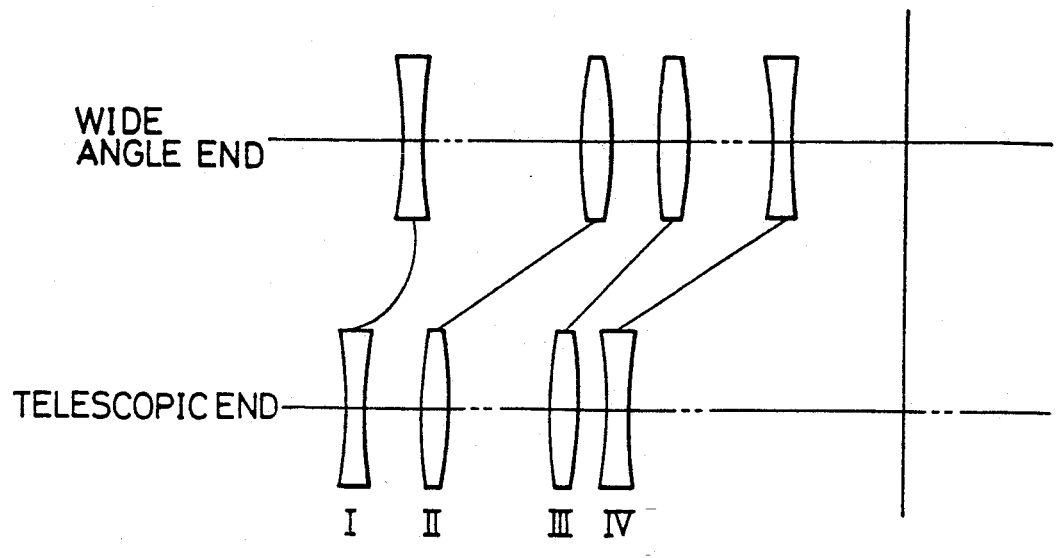
FIG. 1 is a view for explaining the construction of a zoom lens having a first lens structure and a movement of each of lens groups caused by a zooming operation.

As shown in FIG. 1, in a compact zoom lens having a first lens structure, a first lens group I, a second lens group II, a third lens group III and a fourth lens group IV are sequentially arranged from an object side. The object side is a left-hand side in FIG. 1. The first lens group I has a negative focal length. The second lens group II has a positive focal length. The fourth lens group IV has a negative focal length.

When a zooming operation is performed from a wide angle end to a telescopic end, a distance between the first lens group I and the second lens group II is decreased, a distance between the second lens group II and the third lens group III is increased, and a distance between the third lens group III and the fourth lens group IV is decreased.

A focal length $f_1$ of the first lens group, a focal length $f_2$ of the second lens group, a focal length $f_{2,3,4W}$ of a combined lens system of the second, third and fourth lens groups at the wide angle end, a focal length $f_{2,3,4T}$ of the combined lens system of the second, third and fourth lens groups at the telescopic end, a focal length $f_{3,4T}$ of a combined lens system of the third and fourth lens groups at the telescopic end, a focal length $f_W$ of an entire lens system at the wide angle end, and a focal length $f_T$ of the entire lens system at the telescopic end satisfy the following conditions.

$$[f_1 + f_{2,3,4W}\{2-(f_1/f_W)-(f_W/f_1)\}]/f_T < 0.6 \quad (1)$$

$$[f_1 + f_{2,3,4T}\{2-(f_1/f_T)-(f_T/f_1)\}]/f_T < 0.6 \quad (2)$$

$$0.6 < |f_{3,4T}|/f_2 < 6.0 \quad (3)$$

$$0.8 < f_2/f_{2,3,4T} < 1.4 \quad (4)$$

$$0.5 < |f_1|/\sqrt{[f_W \cdot f_T]} < 1.3 \quad (5)$$

In the condition (5), symbol $\sqrt{[\ ]}$ means a square root of a value within bracket [ ].

Figure 2:
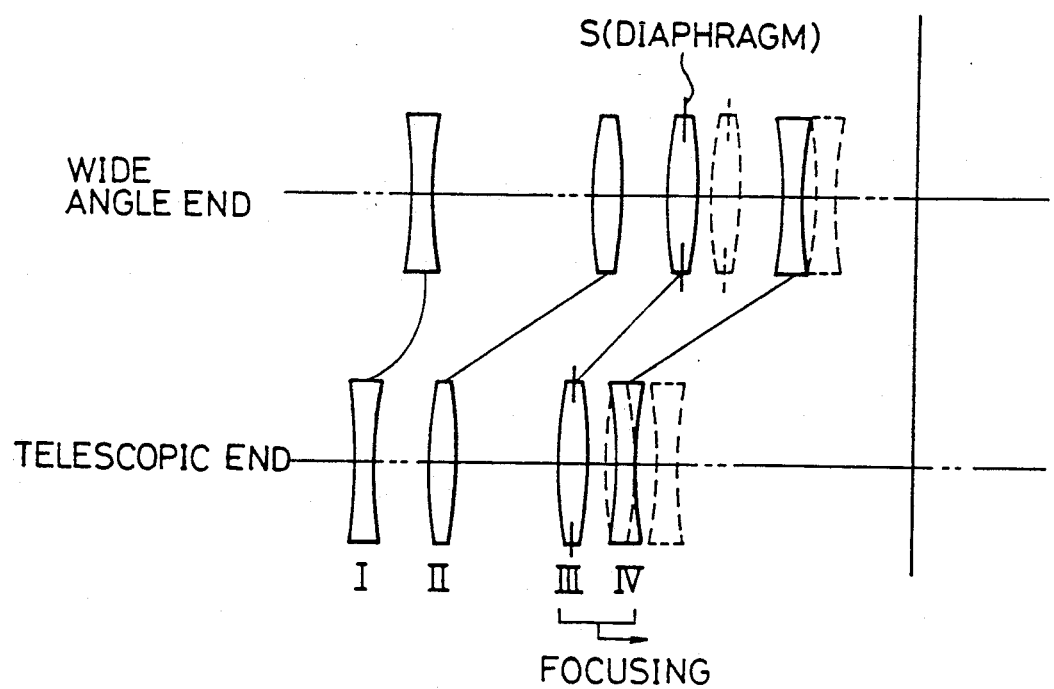
FIG. 2 is a view for explaining movements of respective lens groups caused by the zooming operation of a zoom lens having a second lens structure and caused by the focusing operation of a zoom lens having a fourth lens structure.

As shown in FIG. 2, in the zoom lens having a second lens structure, a diaphragm S is disposed in the third lens group in the first lens structure. Namely, the diaphragm is arranged within the third lens group, or in a position before or after the third lens group.

Figure 3:
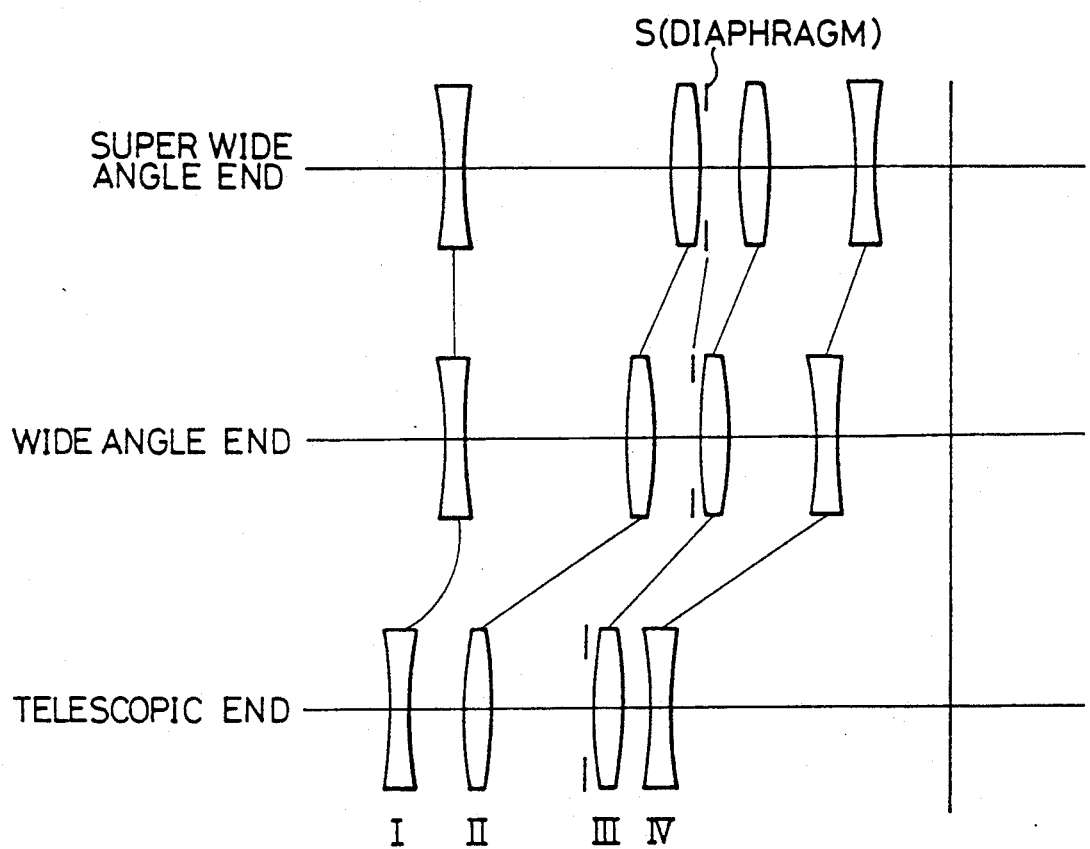
FIG. 3 is a view for explaining a movement of each of lens groups caused by the zooming operation of a zoom lens having a third lens structure between a super wide angle end and a telescopic end.
Figure 4:
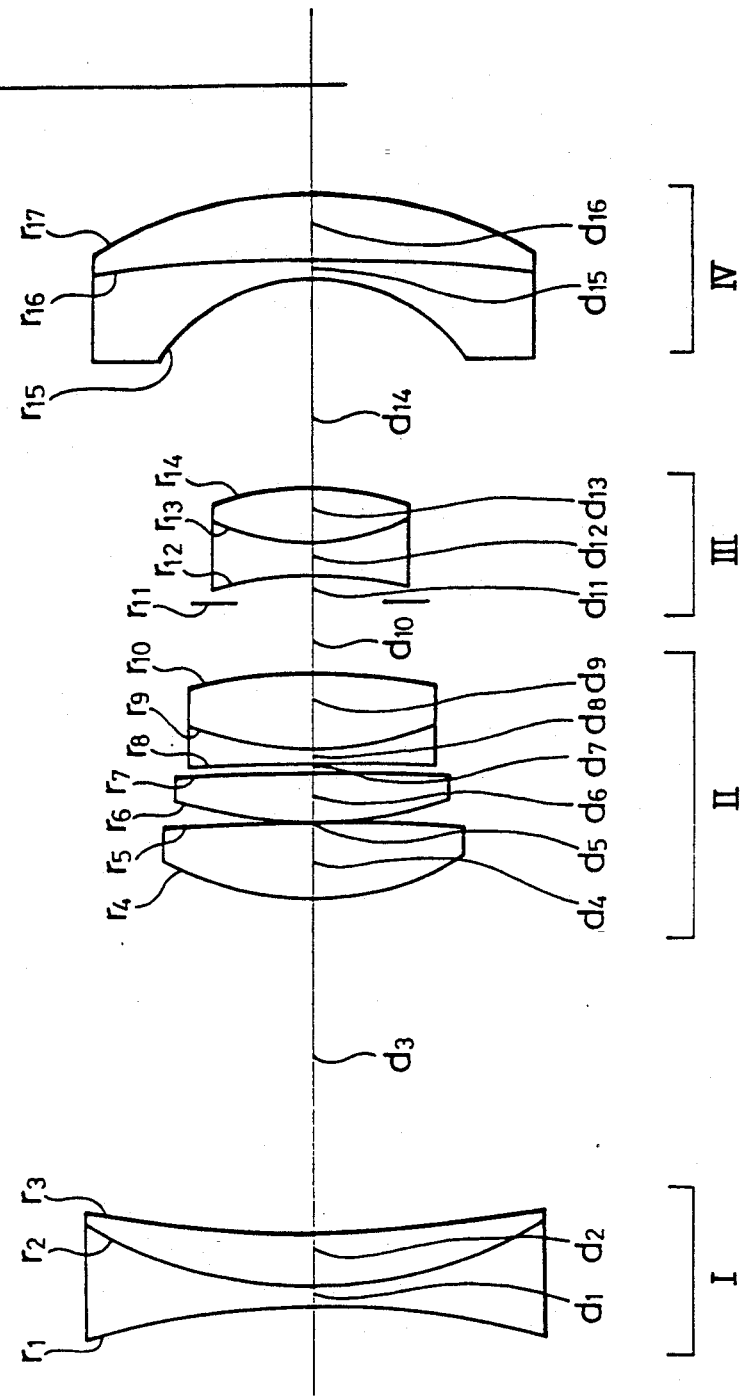
FIG. 4 is a view showing a lens construction at a wide angle end of the zoom lens in accordance with Embodiment 1.
Figure 5:
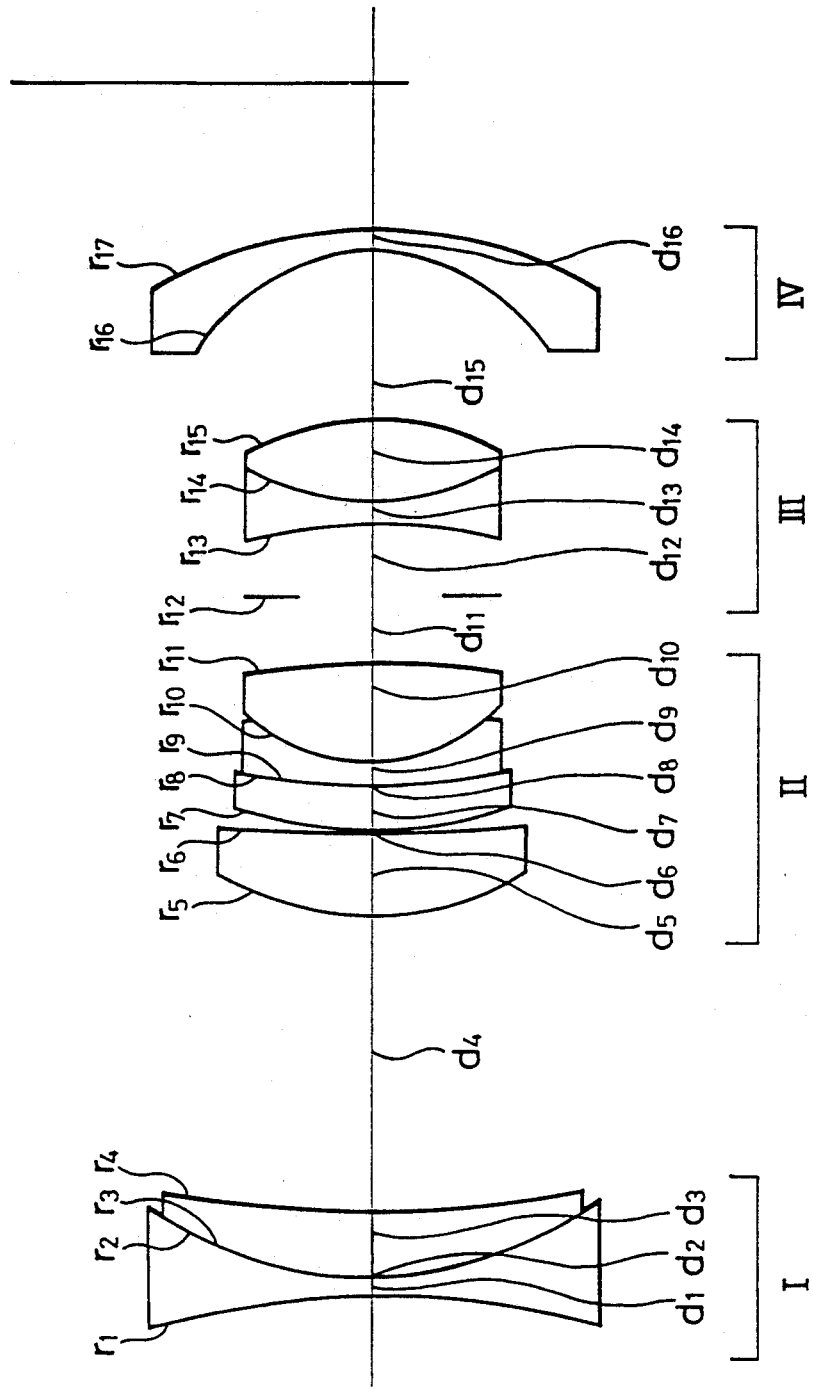
FIG. 5 is a view showing a lens arrangement at a wide angle end of the zoom lens in accordance with Embodiment 2.

As shown in FIG. 3, in the zoom lens having a third lens structure, a diaphragm S is arranged on the object side of the third lens group III in the second lens structure. This zoom lens has a super wide angle end for providing a focal length shorter than that at the wide angle end. At least the distance between the first lens group I and the second lens group II, and a distance between the diaphragm S and the third lens group III are increased when the zooming operation is performed from the wide angle end to the super wide angle end.

As shown in FIG. 2, in the zoom lens having a fourth lens structure, a focusing operation toward a short distance is performed by integrally moving the third lens group III and the fourth lens group IV on an image face side in the first or second lens structure.

The zoom lens of the present invention is basically constructed by two lens groups having negative and positive focal lengths. A rear positive lens component of these two lens groups is divided into three lens groups composed of second, third and fourth lens groups. A distance between the second and third lens groups is increased and a distance between the third and fourth lens groups is decreased when a zooming operation is performed from the wide angle end to the telescopic end. Thus, when the zooming operation is performed from the wide angle end to the telescopic end, the third lens group is relatively moved from a front side to a rear side within a moving range of the positive lens component with respect to the second and fourth lens groups. Accordingly, it is possible to correct a change in aberration caused by the zooming operation within the moving range of the positive lens component. Further, since the third lens group approaches the second lens group at the wide angle end, it is possible to reduce the diameter of a lens constituting the third lens group.

No distance between the second and fourth lens groups is greatly reduced even when the zooming operation is performed on a telescopic side. Accordingly, a moving amount of the fourth lens group can be reduced. The third lens group is relatively moved within the moving range of the positive lens component and the moving amount of the fourth lens group is small so that the number of lenses constituting the fourth lens group can be reduced.

The above conditions (1) and (2) are conditions for holding an entire length of the zoom lens such that this entire length is short. When no conditions (1) and (2) are satisfied, the entire length of the zoom lens is excessively increased when each of the lens groups is approximated by a thin lens. Therefore, it is difficult to reduce a ratio of the entire length of the zoom lens and a focal length thereof at the telescopic end to a value equal to or smaller than one when each of the lens groups is actually constructed by a thick lens.

The above conditions (3), (4) and (5) are conditions for distributing refracting powers of the lens groups when aberrations are considered in a thick lens system.

When the ratio in the condition (3) exceeds a lower limit thereof, it is impossible to sufficiently satisfy a condition for securing a distance between the first and second lens groups by reducing the focal length of a combined lens system of the second, third and fourth lens groups at the telescopic end so that it is difficult to reduce the entire length of the zoom lens. Further, the absolute value of a combined focal length of the third and fourth lens groups is too small at the telescopic end so that it is difficult to correct a Petzval's sum. In contrast to this, when the ratio in the condition (3) exceeds an upper limit thereof, the entire length of the zoom lens can be reduced by increasing a distance between principal points of the second lens group and a combined lens system of the third and fourth lens groups at the telescopic end. However, it is difficult to secure a back focus, or a focal length of the second lens group is excessively reduced. Therefore, it is difficult to correct aberrations and secure the distance between the first and second lens groups at the telescopic end.

When the ratio in the condition (4) exceeds a lower limit thereof, it is difficult to secure the distance between the first and second lens groups at the telescopic end. Otherwise, it is difficult to correct aberrations since the focal length of the second lens group is excessively reduced. In contrast to this, when the ratio in the condition (4) exceeds an upper limit thereof, the focal length of the combined lens system composed of the second, third and fourth lens groups is greatly reduced effectively by the combined lens system of the third and fourth lens groups at the telescopic end. However, an absolute value of the focal length of the combined lens system of the third and fourth lens groups is too small, or the distance between the principal points of the combined lens system composed of the second lens group and the third and fourth lens groups is excessively increased. Accordingly, it is difficult to correct a Petzval's sum.

When the ratio in the condition (5) exceeds a lower limit thereof, absolute values of the focal length of the second lens group and the focal length of the combined lens system of the third and fourth lens groups are too small so that it is difficult to correct aberrations. Otherwise, the absolute value of the focal length of the combined lens system of the third and fourth lens groups is too small and the distance between the principal points of the combined lens system of the second, third and fourth lens groups is excessively increased. Therefore, it is difficult to secure a back focus at the wide angle end and correct a Petzval's sum. In contrast to this, when the ratio in the condition (5) exceeds an upper limit thereof, it is necessary to reduce a back focus at the wide angle end and a thickness of the combined lens system of the second, third and fourth lens groups. Therefore, it is difficult to provide a desirable lens construction. Further, the first lens group is large-sized when a diaphragm is arranged within the second lens group.

The zoom lens of the present invention is desirably constructed as follows.

Namely, the first lens group is constructed by negative and positive lenses sequentially arranged from the object side. An Abbe's number $\nu_{1N}$ of this negative lens and an Abbe's number $\nu_{1P}$ of this positive lens are set to satisfy the following condition.

$$\nu_{1N} > \nu_{1P} \tag{6}$$

In this case, it is possible to correct chromatic aberration within the second lens group.

The second lens group is constructed by at least two lenses composed of positive and negative lenses. An average refractive index $n_{2PA}$ and an average Abbe's number $\nu_{2PA}$ of this positive lens and an average refractive index $n_{2NA}$ and an average Abbe's number $\nu_{2NA}$ of this negative lens are set to satisfy the following conditions.

$$n_{2PA} < n_{2NA} \tag{7}$$

$$\nu_{2PA} > \nu_{2NA} \tag{8}$$

In this case, it is possible to preferably hold the chromatic aberration within the second lens group and the Petzval's sum of an entire lens system.

The third lens group is constructed by at least negative and positive lenses. A refractive index $n_{3N}$ and an Abbe's number $\nu_{3N}$ of this negative lens and a refractive index $n_{3P}$ and an Abbe's number $\nu_{3P}$ of this positive lens are set to satisfy the following conditions.

$$n_{3N} > n_{3P} \tag{9}$$

$$\nu_{3N} > \nu_{3P} \tag{10}$$

In this case, it is possible to correct the chromatic aberration of the entire lens system and preferably hold the Petzval's sum of the entire lens system.

The fourth lens group is constructed by one or two lenses including at least one negative lens since the fourth lens group has a negative focal length.

Further, an aspherical face is preferably used within the second lens group to correct spherical aberration. An aspherical face is also preferably used in the fourth lens group to correct aberration outside an optical axis of the zoom lens.

The zoom lens having the second lens structure has a diaphragm in the third lens group in the first lens structure. The third lens group is arranged near the second lens group at the wide angle end and is separated from the second lens group as the zooming operation is performed toward the telescopic end. A light beam emitted from the second lens group is convergent. Accordingly, a diaphragm diameter is reduced in comparison with a case in which the diaphragm is disposed in the second lens group when the F-number (F/No) is set to be constant at the telescopic end. Thus, it is possible to reduce the diameter of a body tube. At this time, a field angle is reduced on a telescopic side. Accordingly, no lens diameter of each of the first and second lens groups is increased even when the diaphragm is separated from the second lens group. When the diaphragm is separated from the second lens group on the telescopic side, a marginal portion of a light beam outside the optical axis of the zoom lens is interrupted. Further, the F-number (F/No) is increased on a wide angle side.

In the zoom lens having the second lens structure, a distance between the second and third lens groups is reduced and a distance between the third and fourth lens groups is increased when the zooming operation is performed from the telescopic end to the wide angle end. When the focal length of the zoom lens is further reduced, performance of the zoom lens is greatly reduced so that it is difficult to obtain a sufficient performance.

In the zoom lens having the third lens structure, a diaphragm is arranged on an object side of the third lens group and is located in proximity to the third lens group at the wide angle end. When the zooming operation is performed from the wide angle end to a super wide angle end for providing a shorter focal length, the distance between the second and third lens groups is set to be constant and only the diaphragm approaches the second lens group. In this case, a portion of a light beam providing a maximum field angle is set to pass through a center of the diaphragm so that the reduction in performance of the zoom lens is restrained. The focal length of the zoom lens is mainly changed by changing the distance between the first and second lens groups. In this case, a diameter of the diaphragm is desirably reduced to improve performance and increase the amount of a marginal ray.

A focusing system is generally constructed by a front focusing system for moving the first lens group. This front focusing system has advantages that a moving amount of the first lens group is approximately constant if a photographed object is located at the same distance during the zooming operation. However, the first lens group is separated from a camera body so that a driving transmitting mechanism for the first lens group is complicated and the body tube is large-sized.

In the zoom lens having each of the first and second lens structures, the fourth lens group is constructed by a small number of lenses such as one or two lenses to reduce a thickness, a diameter, a weight of the fourth lens group, etc. Accordingly, performance of the zoom lens is greatly reduced when a focusing operation toward a short distance is performed with respect to only the fourth lens group.

Therefore, in the zoom lens having the fourth lens structure, the third and fourth lenses are integrally moved at a focusing time to reduce a change in aberration and preferably hold the performance of the zoom lens at a short distance.

Concrete Embodiments of the present invention will next be described in detail.

In each of the Embodiments, reference numeral $r_i$ designates a radius of curvature of an i-th face including a diaphragm face and counted from the object side. Reference numeral $d_i$ designates a distance between the i-th face and an (i+1)-face on an optical axis of the zoom lens. Reference numerals $n_j$ and $\nu_j$ respectively designate a refractive index and an Abbe's number of a j-th lens counted from the object side with respect to line d. Further, reference numerals f and ω respectively designate a focal length of the entire lens system and a field angle.

In the following description, reference numerals r and K respectively designate a radius of curvature on the optical axis and a conical constant. Reference numerals A, B, C and D respectively designate aspherical coefficients in fourth, sixth, eighth and tenth orders. In this case, as is well known, when a Y-coordinate is set to be in conformity with the optical axis and a Z-coordinate is set to be perpendicular to the optical axis, an aspherical surface is a curved surface obtained by rotating a curve represented by the following formula, $$Z=(1/r)\,Y^2/\{1+\sqrt{[1-(1+K)(Y/r)^2]}\}+A\cdot Y^4+B\cdot Y^6+C\cdot Y^8+D\cdot Y^{10}$$

around the optical axis. A shape of this aspherical surface is specified by giving the radius of curvature on the optical axis, the conical constant and the higher order aspherical coefficients. In the above formula, symbol $\sqrt{[\ ]}$ means a square root of a value within the bracket [ ]. E and a numeral subsequent to this alphabet E designate a power in notation of the aspherical coefficients. Namely, for example, "E-9" means $1/10^9$ and this value $1/10^9$ is multiplied by a numeric value located before this value $1/10^9$.

| Embodiment 1 $f = 36.0 \sim 102$, F/No = 3.42~5.84, $\omega = 64.6 \sim 23.4°$ | | | | | |
|---|---|---|---|---|---|
| i | $r_i$ | $d_i$ | j | $n_j$ | $\nu_j$ |
| 1 | −57.573 | 1.200 | 1 | 1.75500 | 52.32 |
| 2 | 30.153 | 3.448 | 2 | 1.84666 | 23.83 |
| 3 | 76.756 | variable | | | |
| 4 | 20.708 | 4.998 | 3 | 1.60738 | 56.71 |
| 5 | −237.431 | 0.100 | | | |
| 6 | 30.143 | 3.237 | 4 | 1.62374 | 47.05 |
| 7 | −293.787 | 0.607 | | | |
| 8 | −151.722 | 0.800 | 5 | 1.84666 | 23.83 |
| 9 | 19.892 | 4.944 | 6 | 1.56732 | 42.84 |
| 10 | −51.415 | variable | | | |
| 11 | (diaphragm) | 1.678 | | | |
| 12 | −28.975 | 2.204 | 7 | 1.83400 | 37.34 |
| 13 | 17.105 | 3.428 | 8 | 1.64769 | 33.84 |
| 14 | −19.784 | variable | | | |
| 15 | −12.538 | 1.200 | 9 | 1.75500 | 52.32 |
| 16 | −123.793 | 4.155 | 10 | 1.84666 | 23.83 |
| 17 | −34.084 | | | | |

| aspherical surfaces | | |
|---|---|---|
| | sixth face | seventeenth face |
| K | −1.331628 | 3.122429 |
| A | −1.597494E−5 | −2.393576E−6 |
| B | −4.719732E−8 | 3.985625E−8 |
| C | −1.098830E−10 | −1.896888E−10 |
| D | 4.774242E−13 | 9.846180E−13 |

| variable quantities | | | |
|---|---|---|---|
| f | 36.005 | 62.013 | 102.030 |
| $d_3$ | 21.900 | 8.181 | 0.800 |
| $d_{10}$ | 4.820 | 8.303 | 11.395 |
| $d_{14}$ | 13.613 | 10.130 | 7.038 |

| conditional values |
|---|
| $[f_1 + f_{2,3,4W}\{2 - (f_1/f_W) - (f_W/f_1)\}]/f_T = 0.365$ |
| $[f_1 + f_{2,3,4T}\{2 - (f_1/f_T) - (f_T/f_1)\}]/f_T = 0.481$ |
| $|f_{3,4T}|/f_2 = 1.122$ |
| $f_2/f_{2,3,4T} = 1.095$ |
| $|f_1|/\sqrt{[f_W \cdot f_T]} = 0.772$ |

FIG. 2 shows a lens construction in this Embodiment 1. FIGS. 6 to 8 respectively show spherical aberration, astigmatism, distortional aberration and meridional comatic aberration at a wide angle end, an intermediate focal length and a telescopic end of the zoom lens when a distance between a photographed object and the zoom lens is set to be infinite in the Embodiment 1.

Embodiment 2

-continued

| | f = 38.9~102, F/No = 3.60~5.83, ω = 60.5~23.7° | | | | |
|---|---|---|---|---|---|
| i | $r_i$ | $d_i$ | j | $n_j$ | $v_j$ |
| 1 | −54.956 | 1.200 | 1 | 1.75500 | 52.32 |
| 2 | 26.244 | 0.100 | | | |
| 3 | 26.238 | 4.182 | 2 | 1.84666 | 23.83 |
| 4 | 84.317 | variable | | | |
| 5 | 19.832 | 5.685 | 3 | 1.71300 | 53.94 |
| 6 | 124.846 | 0.100 | | | |
| 7 | 27.241 | 2.831 | 4 | 1.69350 | 53.34 |
| 8 | 43.718 | 0.100 | | | |
| 9 | 40.264 | 1.361 | 5 | 1.84666 | 23.83 |
| 10 | 12.287 | 6.384 | 6 | 1.49831 | 65.13 |
| 11 | −64.495 | variable | | | |
| 12 | (diaphragm) | 4.551 | | | |
| 13 | −34.392 | 1.351 | 7 | 1.88300 | 40.80 |
| 14 | 16.621 | 5.225 | 8 | 1.67741 | 28.52 |
| 15 | −18.466 | variable | | | |
| 16 | −11.524 | 1.200 | 9 | 1.69350 | 53.34 |
| 17 | −29.610 | | | | |

| aspherical surfaces | | |
|---|---|---|
| | seventh face | sixteenth face |
| K | −0.883397 | 0.668418 |
| A | −1.550430E−5 | −1.446700E−6 |
| B | −3.487110E−8 | 9.788130E−8 |
| C | −4.843080E−11 | −9.826040E−10 |
| D | 2.800350E−13 | 4.782570E−12 |

| variable quantities | | | |
|---|---|---|---|
| object distance: infinity | | | |
| f | 38.935 | 49.979 | 102.002 |
| $d_4$ | 19.367 | 13.484 | 1.000 |
| $d_{11}$ | 4.616 | 5.762 | 9.504 |
| $d_{15}$ | 11.116 | 9.857 | 8.186 |
| object distance: 1.0 m | | | |
| f | 38.935 | 49.979 | 102.002 |
| $d_4$ | 19.367 | 13.484 | 1.000 |
| $d_{11}$ | 6.022 | 7.348 | 12.219 |
| $d_{15}$ | 11.116 | 9.857 | 8.186 | conditional values $[f_1 + f_{2,3,4W}\{2 - (f_1/f_W) - (f_W/f_1)\}]/f_T = 0.372$
$[f_1 + f_{2,3,4T}\{2 - (f_1/f_T) - (f_T/f_1)\}]/f_T = 0.482$
$|f_{3,4T}|/f_2 = 1.384$
$f_2/f_{2,3,4T} = 1.231$ FIG. 2 shows a lens construction in this Embodiment 2. FIGS. 9 to 11 respectively show spherical aberration, astigmatism, distortional aberration and meridional comatic aberration at the wide angle end, the intermediate focal length and the telescopic end of the zoom lens when the distance between the photographed object and the zoom lens is set to be infinite in the Embodiment 2. FIGS. 12 to 14 respectively show spherical aberration, astigmatism, distortional aberration and meridional comatic aberration at the wide angle end, the intermediate focal length and the telescopic end of the zoom lens when the distance between the photographed object and the zoom lens is set to 1 m.

The zoom lens having the third lens structure in the above Embodiment 2 is used in the following case. In this case, a super wide angle end providing a focal length shorter than that at the wide angle end is realized by using the lens construction in the Embodiment 2. In this case, $d_{12}$ is set to a new variable in addition to the lens construction in the above Embodiment 2.

| variable quantities | | |
|---|---|---|
| f | 30.000 | 38.935 |
| $d_4$ | 24.904 | 19.367 |
| $d_{11}$ | 1.000 | 4.616 |
| $d_{12}$ | 8.932 | 4.551 |

-continued

| variable quantities | | |
|---|---|---|
| $d_{15}$ | 11.937 | 11.116 |

FIG. 15 shows spherical aberration, astigmatism, distortional aberration and meridional comatic aberration at the super wide angle end of the zoom lens. In aberration diagrams shown in FIGS. 6 to 15, reference numerals dSA, gSA and SC respectively designate spherical aberration on line d, spherical aberration on line g, and a sine condition. Reference numerals S, M and Y' respectively designate a sagittal image surface on line d, a meridional image surface on line d, and an image height.

As mentioned above, in accordance with the present invention, it is possible to provide a compact zoom lens. In the zoom lens having a first lens structure, the third lens group is moved such that this third lens group is separated from the second lens group when a zooming operation is performed from a wide angle end to a telescopic end. Accordingly, the number of lenses constituting the fourth lens group having a large diameter can be reduced to one or two. Therefore, a degree of freedom in aberration correction is increased so that the entire length of the zoom lens can be reduced.

In the zoom lens having a second lens structure, the diameter of a diaphragm can be reduced since the diaphragm is arranged in the third lens group. In the zoom lens having a third lens structure, a super wide angle can be realized by further widening a zooming region on a wide angle side. In the zoom lens having a fourth lens structure, the third and fourth lens groups are integrally moved in a focusing operation so that image performance at a short distance can be preferably held.

Many widely different embodiments of the present invention may be constructed without departing from the spirit and scope of the present invention. It should be understood that the present invention is not limited to the specific embodiments described in the specification, except as defined in the appended claims.

What is claimed is:

1. A compact zoom lens comprising first to fourth lens groups sequentially arranged from an object side,
    the first, second and fourth lens groups respectively having negative, positive and negative focal lengths;
    the zoom lens being constructed such that a distance between the first and second lens groups is decreased, a distance between the second and third lens groups is increased, and a distance between the third and fourth lens groups is decreased when a zooming operation is performed from a wide angle end to a telescopic end; and
    a focal length $f_1$ of the first lens group, a focal length $f_2$ of the second lens group, a focal length $f_{2,3,4W}$ of a combined lens system of the second, third and fourth lens groups at the wide angle end, a focal length $f_{2,3,4T}$ of the combined lens system of the second, third and fourth lens groups at the telescopic end, a focal length $f_{3,4T}$ of a combined lens system of the third and fourth lens groups at the telescopic end, a focal length $f_W$ of an entire lens system at the wide angle end, and a focal length $f_T$ of the entire lens system at the telescopic end satisfying the following conditions, $$[f_1+f_{2,3,4W}\{2-(f_1/f_W)-(f_W/f_1)\}]/f_T<0.6 \quad (1)$$

$$[f_1 + f_{2,3,4T}\{2-(f_1/f_T)-(f_T/f_1)\}]/f_T < 0.6 \quad (2)$$

$$0.6 < |f_{3,4T}|/f_2 < 6.0 \quad (3)$$

$$0.8 < f_2/f_{2,3,4T} < 1.4 \quad (4)$$

$$0.5 < |f_1|/\sqrt{[f_W \cdot f_T]} < 1.3 \quad (5)$$

where symbol $\sqrt{[\ ]}$ means a square root of a value within bracket [ ].

2. A compact zoom lens as claimed in claim 1, wherein a diaphragm is disposed in the third lens group.

3. A compact zoom lens as claimed in claim 2, wherein a diaphragm is arranged on the object side of the third lens group and the zoom lens has a super wide angle end for providing a focal length shorter than that at the wide angle end, and at least the distance between the first and second lens groups, and a distance between the above diaphragm and the third lens group are increased when the zooming operation is performed from the wide angle end to the super wide angle end.

4. A compact zoom lens as claimed in claim 1 or 2, wherein a focusing operation toward a short distance is performed by integrally moving the third and fourth lens groups on an image face side.

* * * * *